United States Patent
Allen et al.

(10) Patent No.: US 8,671,524 B2
(45) Date of Patent: Mar. 18, 2014

(54) PRODUCTION OF AND DRYING OF COPOLYMER FIBERS

(75) Inventors: Steven R. Allen, Midlothian, VA (US); Christopher William Newton, Richmond, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 38 days.

(21) Appl. No.: 13/349,611

(22) Filed: Jan. 13, 2012

(65) Prior Publication Data

US 2013/0014348 A1    Jan. 17, 2013

Related U.S. Application Data

(60) Provisional application No. 61/432,339, filed on Jan. 13, 2011.

(51) Int. Cl.
*D01B 9/00* (2006.01)

(52) U.S. Cl.
USPC .......................................................... 19/0.27

(58) Field of Classification Search
USPC ....... 19/0.27; 34/345, 446; 264/176.1, 178 R, 264/183, 184, 204, 211.12, 211.15, 211.17, 264/211.18, 211.2
See application file for complete search history.

(56) References Cited

U.S. PATENT DOCUMENTS

| | | | |
|---|---|---|---|
| 3,227,793 A | 1/1966 | Cipriani | |
| 3,414,645 A | 12/1968 | Morgan | |
| 3,767,756 A | 10/1973 | Blades | |
| 4,075,172 A * | 2/1978 | Ozawa et al. | 528/183 |
| 5,174,046 A | 12/1992 | Chern | |
| 5,667,743 A | 9/1997 | Tai et al. | |
| 2010/0001433 A1* | 1/2010 | Boerstoel et al. | 264/291 |
| 2010/0029159 A1 | 2/2010 | Ishihara et al. | |
| 2011/0048604 A1* | 3/2011 | Kwon | 152/451 |
| 2013/0014405 A1* | 1/2013 | Allen et al. | 34/282 |
| 2013/0015603 A1* | 1/2013 | Allen et al. | 264/234 |

FOREIGN PATENT DOCUMENTS

| | | |
|---|---|---|
| CN | 101851809 | 10/2010 |
| GB | 1381181 | 1/1975 |
| RU | 2045586 | 10/1995 |
| RU | 2285071 | 10/2006 |
| RU | 2285760 | 10/2006 |
| RU | 2285761 | 10/2006 |
| WO | WO 2005/054337 | 6/2005 |

OTHER PUBLICATIONS

V.N. Sugak, Fabrication of Fibres from Sulfuric Acid Solucaitons of CoPolyamides Containing Polyamaide-Benzimidale Units and Their Heat Treatment, 1999, vol. 31, No. 1.

(Continued)

*Primary Examiner* — Shaun R Hurley

(57) ABSTRACT

The present invention concerns processes for reducing water in never-dried fiber comprising copolymer derived from the copolymerization of para-phenylenediamine, 5(6)-amino-2-(p-aminophenyl)benzimidazole; and terephthaloyl dichloride, the process having the following steps in a continuous process, (a) a step of drying a never-dried fiber having at least 0.1% sulfur at less than 150° C. until the moisture content of the fiber is less than 60 weight percent; and (b) a step of further drying the fiber above 150° C. while the moisture content of the fiber is no more than 60 weight percent; and the fiber being further heated to at least 350° C. in either an additional continuous or separate step.

19 Claims, 2 Drawing Sheets

(56) References Cited

OTHER PUBLICATIONS

PCT International Search Report and Written Opinion for International Application No. PCT/US2012/021231 dated Mar. 30, 2012.

PCT International Search Report and Written Opinion for International Application No. PCT/US2012/021239, dated Mar. 30, 2012.
PCT International Search Report and Written Opinion for International Application No. PCT/US2012/021245, dated Mar. 30, 2012.

* cited by examiner

PRODUCTION OF AND DRYING OF COPOLYMER FIBERS

TECHNICAL FIELD

The present application concerns methods of producing and drying copolymer fibers.

BACKGROUND

Advances in polymer chemistry and technology over the last few decades have enabled the development of high-performance polymeric fibers. For example, liquid-crystalline polymer solutions of heterocyclic rigid-rod polymers can be formed into high strength fibers by spinning liquid-crystalline polymer solutions into dope filaments, removing solvent from the dope filaments, washing and drying the fibers; and if desired, further heat treating the dried fibers. One example of high-performance polymeric fibers is para-aramid fiber such as poly (paraphenylene terephthalamide) ("PPD-T" or "PPTA").

Fiber strength is typically correlated to one or more polymer parameters, including composition, molecular weight, intermolecular interactions, backbone, residual solvent or water, macromolecular orientation, and process history. For example, fiber strength typically increases with polymer length (i.e., molecular weight), polymer orientation, and the presence of strong attractive intermolecular interactions. As high molecular weight rigid-rod polymers are useful for forming polymer solutions ("dopes") from which fibers can be spun, increasing molecular weight typically results in increased fiber strength.

Fibers derived from 5(6)-amino-2-(p-aminophenyl)benzimidazole, para-phenylenediamine and terephthaloyl dichloride are known in the art. Hydrochloric acid is produced as a by-product of the polymerization reaction. The majority of the fibers made from such copolymers have generally been spun directly from the polymerization solution without further treatment. Such copolymers are the basis for a high strength fibers manufactured in Russia, for example, under the trade names Armos® and Rusar®. See, Russian Patent Application No. 2,045,586. However, the copolymer can be isolated from the polymerization solvent and then redissolved in another solvent, typically sulfuric acid, to spin fibers.

Previously, it was not appreciated that fibers derived from copolymers of 5(6)-amino-2-(p-aminophenyl)benzimidazole, para-phenylenediamine and terephthaloyl dichloride are prone to thermal damage when drying in a continuous process even at low drying temperatures. This thermal damage can create yarns having depressed tensile properties. Therefore, what is needed are new methods to dry and further heat treat these copolymer fibers without damage.

Known processes for making copolymer fibers directly from polymerization solution, while producing a good product for use in ballistic and other aramid end-uses, are very expensive with very poor investment economics. As such, there is a need in the art for manufacturing process wherein the copolymer is solutioned in a common solvent, such as sulfuric acid which has both improved economics compared to processes known in the art and provides copolymer fibers having superior long-term physical properties.

SUMMARY

In some embodiments, the invention concerns processes for reducing water in never-dried fiber comprising copolymer derived from the copolymerization of para-phenylenediamine, 5(6)-amino-2-(p-aminophenyl)benzimidazole; and terephthaloyl dichloride. The processes having the following steps in a continuous process: (a) a step of drying a never-dried fiber having at least 0.1 wt % sulfur at 150° C. or less until the moisture content of the fiber is less than 60 weight, and (b) a step of further drying the fiber above 150° C. while the moisture content of the fiber is less than 60 weight percent. The resulting dried fiber is further heated to at least 350° C. in either an additional continuous or separate step. In some embodiments, the fiber in step (a) is dried at 100° C. or less or at 50° C. or less.

In certain embodiments, in step (a) the fiber is dried until the moisture content is less than 50%. In some processes, in step (a) the fiber is dried until the moisture content is less than 40%

Additional processes steps may occur between steps (a) and (b) and/or between step (b) and the further drying step. In some embodiments, after step (a), the fiber is further dried at an additional step at less than 150° C. until moisture content is less than 50%, prior to step (b). In other embodiments, after step (a) the fiber is further dried at an additional step at less than 150° C. until moisture content is less than 40%, prior to step (b).

In certain processes, in step (a) the fiber is heated to 30° C. or greater. In other processes, in step (a) the fiber is heated to 40° C. or greater.

The heating in step (a) may performed until the fiber has a moisture content of 6 weight percent or less in some embodiments of the invention. In some embodiments, step (a) is carried out in less than ten minutes. In other embodiments, step (a) is carried out in less than 180 seconds.

In regard to the further heating step, the filaments are heated above 400° C. in the last step.

Tension may be applied to the filaments during heating steps. In some preferred embodiments, the filaments are heated in step (a) under a tension of at least 0.11 gpd. In certain preferred embodiments, the filaments are heated in the last step under a tension of 1 gpd or less.

Preferred copolymers include those derived from the copolymerization of para-phenylenediamine, 5(6)-amino-2-(p-aminophenyl)benzimidazole; and terephthaloyl dichloride. In some embodiments, the ratio of moles of 5(6)-amino-2-(p-aminophenyl)benzimidazole to the moles of para-phenylenediamine is 30/70 to 85/15. In other embodiments, the ratio is 45/55 to 85/15. For some copolymers, the ratio of (a) the moles of para-phenylenediamine and 5(6)-amino-2-(p-aminophenyl)benzimidazole to (b) the moles of terephthaloyl dichloride is 0.9-1.1.

Any practical heating method may utilized. In some processes the heating is accomplished by contacting said yarn with heated gas. Heated gas may be any gas that does not damage the yarn. Examples of heated gas include air and nitrogen. The heated gas may be within an oven in step (a). Alternatively, the filaments are heated by contacting said filaments with a hot surface.

Another aspect of the invention concerns processes for producing filaments comprising a copolymer derived from the copolymerization of para-phenylenediamine, 5(6)-amino-2-(p-aminophenyl)benzimidazole; and terephthaloyl dichloride, including the following steps in a continuous process:

(a) a step of spinning filaments into a coagulation bath from a sulfuric acid solution of the copolymer;

(b) a step of contacting the filaments with one or more of (i) wash and (ii) neutralization fluid; and (c) a step of drying a never-dried fiber having at least 0.1% sulfur at 150° C. or less until the moisture content of the fiber is less than 60 weight percent;

(d) an optional step of further drying the fiber at a temperature higher than step (c);

(e) a step of further drying the fiber above 150° C. while the moisture content of the fiber is no more than 60 weight percent;

the fiber being further heated to at least 350° C. in either an additional continuous or separate step. In some embodiments, the filaments are heated above 400° C. in the last step.

In some embodiments, the combination of steps (c) and (d) is carried out in less than ten minutes. In yet other embodiments, the combination of steps (c) and (d) is carried out in less than 180 seconds.

In certain embodiments, the filaments are heated in step (c) under a tension of at least 0.1 gpd. In certain embodiments, the filaments are heated in the last step under a tension of less than 1 gpd. In regard to heating temperatures, in step (c) the fiber is heated to 30° C. or greater or to 40° C. or greater. In some preferred embodiments, in step (c) or (d) the fiber is heated until the moisture content is 6 weight percent or less.

BRIEF DESCRIPTION OF THE DRAWINGS

The foregoing summary, as well as the following detailed description, is further understood when read in conjunction with the appended drawings. For the purpose of illustrating the invention, there is shown in the drawings exemplary embodiments of the invention; however, the invention is not limited to the specific methods, compositions, and devices disclosed. In the drawings.

DETAILED DESCRIPTION OF ILLUSTRATIVE EMBODIMENTS

Figure 1:
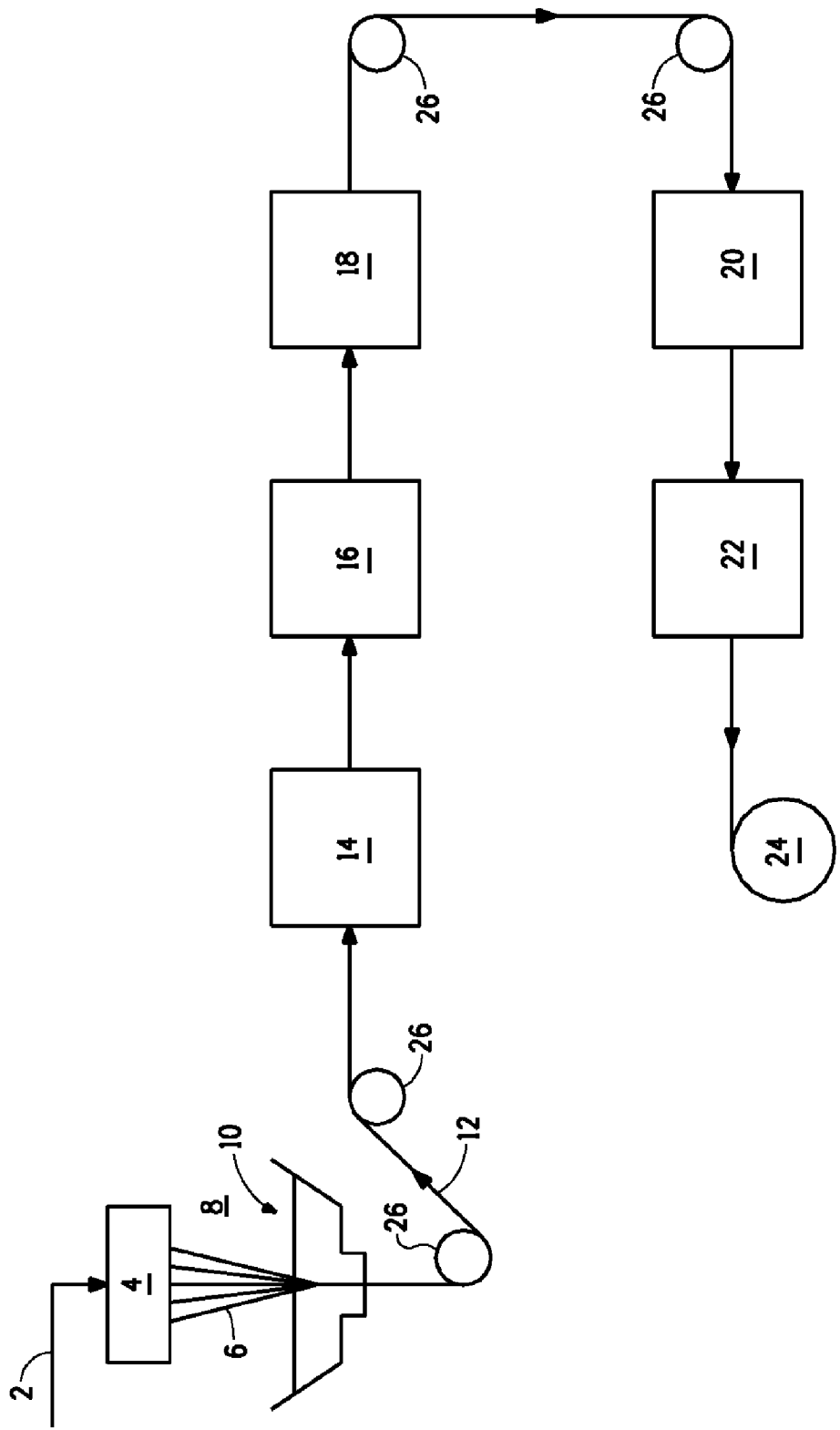
FIG. 1 is a schematic diagram of a fiber production process.

The present invention may be understood more readily by reference to the following detailed description taken in connection with the accompanying figures and examples, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When any variable occurs more than one time in any constituent or in any formula, its definition in each occurrence is independent of its definition at every other occurrence. Combinations of substituents and/or variables are permissible only if such combinations result in stable compounds.

By "never-dried" it is meant the moisture content of the fiber is at least 75 weight percent of the fiber.

The present invention is related to a process which performs the polymerization of 5(6)-amino-2-(p-aminophenyl) benzimidazole, para-phenylenediamine and terephthaloyl dichloride at high solids (7 weight percent or greater) in NMP/CaCl$_2$ or DMAC/CaCl$_2$, isolates the copolymer crumb, dissolves the isolated copolymer crumb in concentrated sulfuric acid to form a liquid crystalline solution, and spins the solution into fibers. By "solids" it is meant the ratio of the mass of copolymer to the total mass of the solution, that is, the mass of the copolymer plus solvent.

The copolymerization reaction of 5(6)-amino-2-(p-aminophenyl)benzimidazole, para-phenylenediamine and terephthaloyl dichloride can be accomplished by means known in the art. See, for example, PCT Patent Application No. 2005/054337 and U.S. Patent Application No. 2010/0029159. Typically, one or more acid chloride(s) and one or more aromatic diamine(s) are reacted in an amide polar solvent such as N,N-dimethylformamide, N,N-dimethylacetamide, N-methyl-2-pyrrolidone, dimethylimidazolidinone and the like. N-methyl-2-pyrrolidone is preferred in some embodiments.

In some embodiments, before or during the polymerization, a solubility agent of an inorganic salt such as lithium chloride or calcium chloride, or the like is added in a suitable amount to enhance the solubility of the resulting copolyamide in the amide polar solvent. Typically, 3 to 10% by weight relative to the amide polar solvent is added. After the desired degree of polymerization has been attained, the copolymer is present in the form of an un-neutralized crumb. By "crumb" it is meant the copolymer is in the form of a friable material or gel that easily separates into identifiable separate masses when sheared. The un-neutralized crumb includes the copolymer, the polymerization solvent, the solubility agent and the byproduct water and acid from the condensation reaction, typically hydrochloric acid (HCl).

After completing the polymerization reaction, the un-neutralized crumb is then contacted with a base, which can be a basic inorganic compound, such as sodium hydroxide, potassium hydroxide, calcium hydroxide, calcium oxide, ammonium hydroxide, and the like. The basic inorganic compound can be used in aqueous solution to perform a neutralization reaction of the HCl by-product. If desired, the basic compound can be an organic base such as diethyl amine or tributyl amine or other amines. Typically, the un-neutralized copolymer crumb is contacted with the aqueous base by washing, which converts the acidic byproduct to a salt (generally a sodium chloride salt if sodium hydroxide is the base and HCl is the acidic byproduct) and also removes some of the polymerization solvent. If desired, the un-neutralized copolymer crumb can be optionally first washed one or more times with water prior to contacting with the basic inorganic compound to remove excess polymerization solvent. Once the acidic byproduct in the copolymer crumb is neutralized, additional water washes can be employed to remove salt and polymerization solvent and lower the pH of the crumb, if needed.

This invention also relates to a process for forming an aramid yarn comprising dissolving a copolymer crumb derived from the copolymerization of para-phenylenediamine, 5(6)-amino-2-(p-aminophenyl)benzimidazole; and terephthaloyl dichloride in sulfuric acid to form a spinning solution, wherein the copolymer crumb is neutralized prior to forming said spinning solution; said copolymer having an inherent viscosity of at least 3 dl/g and having less than 0.4 mol/Kg of titrate-able acid. In one preferred embodiment, the copolymer crumb is neutralized by washing with an aqueous base. Terephthaloyl dichloride is also known as terephthaloyl chloride.

The copolymer is preferably spun into fiber using solution spinning Generally this involves solutioning the neutralized copolymer crumb in a suitable solvent to form a spin solution (also known as spin dope), the preferred solvent being sulfuric acid. The inventors have found that the use of copolymer crumb that has been neutralized as described herein dramatically reduces the formation of bubbles in the spin dope when such neutralized crumb is combined with sulfuric acid in the solutioning process. If the copolymer crumb is not neutralized, the hydrochloric acid by-product in the copolymer will volatize on contact with the sulfuric acid and form bubbles in the spin dope. Since the solution viscosity of the spin dope is relatively high, any such bubbles that are formed during solutioning tend to stay in the spin dope and are spun into the filaments. The neutralized copolymer crumb, when solutioned in sulfuric acid, provides an essentially bubble-free and therefore more uniform spinning solution which is believed to provide more uniformly superior copolymer filaments and fibers.

The spin dope containing the copolymer described herein can be spun into dope filaments using any number of processes; however, wet spinning and "air-gap" spinning are the best known. The general arrangement of the spinnerets and baths for these spinning processes is well known in the art, with the figures in U.S. Pat. Nos. 3,227,793; 3,414,645; 3,767,756; and 5,667,743 being illustrative of such spinning processes for high strength polymers. In "air-gap" spinning the spinneret typically extrudes the fiber first into a gas, such as air and is a preferred method for forming filaments It is believed that in addition to producing the spinning dope with neutralized copolymer crumb, for the best fiber properties, the manufacturing process of spinning fibers from an acid solvent should additionally include not only steps that extract acid solvent from the dope filaments but also further remove and/or neutralize any remaining acid associated with or bound to the copolymer in the fiber. It is believed that failure to do this can result in more potential degradation of the copolymer in the fiber and subsequent decrease in fiber mechanical properties over time.

One process for making copolymer filaments or yarns is shown in FIG. 1. The dope solution 2, comprising copolymer and sulfuric acid, typically contains a high enough concentration of polymer for the polymer to form an acceptable filament 6 after extrusion and coagulation. When the polymer is lyotropic liquid-crystalline, the concentration of polymer in the dope 2 is preferably high enough to provide a liquid-crystalline dope. The concentration of the polymer is preferably at least about 7 weight percent, more preferably at least about 10 weight percent and most preferably at least about 14 weight percent.

The polymer dope solution 2 may contain additives such as anti-oxidants, lubricants, ultra-violet screening agents, colorants and the like which are commonly incorporated.

The polymer dope solution 2 is typically extruded or spun through a die or spinneret 4 to prepare or form the dope filaments 6. The spinneret 4 preferably contains a plurality of holes. The number of holes in the spinneret and their arrangement is not critical, but it is desirable to maximize the number of holes for economic reasons. The spinneret 4 can contain as many as 100 or 1000, or more, and they may be arranged in circles, grids, or in any other desired arrangement. The spinneret 4 may be constructed out of any materials that will not be severely degraded by the dope solution 2.

The spinning process of FIG. 1 employs "air-gap" spinning (also sometimes known as "dry-jet" wet spinning) Dope solution 2 exits the spinneret 4 and enters a gap 8 (typically called an "air gap" although it need not contain air) between the spinneret 4 and a coagulation bath 10 for a very short duration of time. The gap 8 may contain any fluid that does not induce coagulation or react adversely with the dope, such as air, nitrogen, argon, helium, or carbon dioxide. The dope filament 6 proceeds across the air gap 8, and is immediately introduced into a liquid coagulation bath. Alternately, the fiber may be "wet-spun" (not shown). In wet spinning, the spinneret typically extrudes the fiber directly into the liquid of a coagulation bath and normally the spinneret is immersed or positioned beneath the surface of the coagulation bath. Either spinning process may be used to provide fibers for use in the processes of the invention. In some embodiments of the present invention, air-gap spinning is preferred.

The filament 6 is "coagulated" in the coagulation bath 10 containing water or a mixture of water and sulfuric acid. If multiple filaments are extruded simultaneously, they may be combined into a multifilament yarn before, during or after the coagulation step. The term "coagulation" as used herein does not necessarily imply that the dope filament 6 is a flowing liquid and changes into a solid phase. The dope filament 6 can be at a temperature low enough so that it is essentially non-flowing before entering the coagulation bath 10. However, the coagulation bath 10 does ensure or complete the coagulation of the filament, i.e., the conversion of the polymer from a dope solution 2 to a substantially solid polymer filament 12. The amount of solvent, i.e., sulfuric acid, removed during the coagulation step will depend on the residence time of the filament 6 in the coagulation bath, the temperature of the bath 10, and the concentration of solvent therein. For example, using a 18 weight percent copolymer/sulfuric acid solution at a temperature of about 23° C., a residence time of about one second will remove about 30 percent of the solvent present in the filament 6.

After the coagulation bath, the fiber may be contacted with one or more washing baths or cabinets 14. Washes may be accomplished by immersing the fiber into a bath or by spraying the fiber with the aqueous solution. Washing cabinets typically comprise an enclosed cabinet containing one or more rolls which the yarn travels around a number of times, and across, prior to exiting the cabinet. As the yarn 12 travels around the roll, it is sprayed with a washing fluid. The washing fluid is continuously collected in the bottom of the cabinet and drained therefrom.

The temperature of the washing fluid(s) is preferably greater than 30° C. The washing fluid may also be applied in vapor form (steam), but is more conveniently used in liquid form. Preferably, a number of washing baths or cabinets are used. The residence time of the yarn 12 in any one washing bath or cabinet 14 will depend on the desired concentration of residual sulfur in the yarn 12. In a continuous process, the duration of the entire washing process in the preferred multiple washing bath(s) and/or cabinet(s) is preferably no greater than about 10 minutes, more preferably greater than about 5 seconds. In some embodiments the duration of the entire washing process is 20 seconds or more; in some embodiments the entire washing is accomplished in 400 seconds or less. In a batch process, the duration of the entire washing process can be on the order of hours, as much as 12 to 24 hours or more.

Neutralization of the sulfuric acid in the yarn can occur in bath or cabinet 16. In some embodiments, the neutralization bath or cabinet may follow one or more washing baths or cabinets. Washes may be accomplished by immersing the fiber into a bath or by spraying the fiber with the aqueous solution. Neutralization may occur in one bath or cabinet or in multiple baths or cabinets. In some embodiments, preferred bases for the neutralization of sulfuric acid impurity include NaOH; KOH; $Na_2CO_3$; $NaHCO_3$; $NH_4OH$; $Ca(OH)_2$; $K_2CO_3$; $KHCO_3$; or trialkylamines, preferably tributylamine;

other amines; or mixtures thereof. In one embodiment, the base is water soluble. In some preferred examples the neutralization solution is an aqueous solution containing 0.01 to 1.25 mols of base per liter, preferably 0.01 to 0.5 mols of base per liter. The amount of cation is also dependent on the time and temperature of exposure to the base and the washing method. In some preferred embodiments, the base is NaOH or $Ca(OH)_2$. After treating the fiber with base, the process optionally may include the step of contacting the yarn with a washing solution containing water or an acid to remove all or substantially all excess base. This washing solution can be applied in one or more washing baths or cabinets 18.

After washing and neutralization, the fiber or yarn 12 may be dried in a dryer 20 to remove water and other liquids. One or more dryers may be used. In certain embodiments, the dryer may be an oven which uses heated air to dry the fibers. In other embodiments, heated rolls may be used to heat the fibers. The fiber is heated in the dryer to a temperature of at least about 20° C. but less than about 100° C. until the moisture content of the fiber is 20 weight percent of the fiber or less. In some embodiments the fiber is heated to 85° C. or less. In some embodiments the fiber is heated under those conditions until the moisture content of the fiber is 14 weight percent of the fiber or less. The inventors have discovered that low temperature drying is a preferred route to improved fiber strength. Specifically, the inventors have found that the best fiber strength properties are achieved when the first drying step (i.e. heated roll, heated atmosphere as in an oven, etc.) experienced by the never-dried yarn is conducted at gentle temperatures not normally used in continuous processes used to dry high strength fibers on commercial scale. It is believed that the copolymer fiber has more affinity to water than PPD-T homopolymer; this affinity slows the diffusion rate of water out of the polymer during drying and consequently if the never-dried yarn is directly exposed to typical high drying temperatures, generally used to created a large thermal driving force and reduce drying time, irreparable damage to the fiber occurs resulting in lower fiber strength. In some embodiments, the fiber is heated at least to about 30° C.; in some embodiments the fiber is heated at least to about 40° C.

The dryer residence time is less than ten minutes and is preferably less than 180 seconds. The dryer can be provided with a nitrogen or other non-reactive atmosphere. The drying step typically is performed at atmospheric pressure. If desired, however, the step may be performed under reduced pressure. In one embodiment, the filaments are dried under a tension of at least 0.1 gpd, preferably a tension of 2 gpd or greater.

Following the drying step, the fiber is preferably further heated to a temperature of at least 350° C. in, for instance, a heat setting device 22. One or more devices may be utilized. For example, such processing may be done in a nitrogen purged tube furnace 22 for increasing tenacity and/or relieving the mechanical strain of the molecules in the filaments. In some embodiments, the fiber or yarn is heated to a temperature of at least 400° C. In one embodiment, the filaments are further under a tension of 1 gpd or less, using only enough tension to advance the yarn through the heating device.

In some embodiments, the heating is a multistep process. For example, in a first step the fiber or yarn may heated at a temperature of 200 to 360° C. at a tension of at least 0.2 cN/dtex, followed by a second heating step where the fiber or yarn is heated at a temperature of 370 to 500° C. at a tension of less than 1 cN/dtex.

Finally, the yarn 12 is wound up into a package on a windup device 24. Rolls, pins, guides, and/or motorized devices 26 are suitably positioned to transport the filament or yarn through the process. Such devices are well known in the art and any suitable device may be utilized.

Molecular weights of polymers are typically monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$," or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

where ln is the natural logarithm function and C is the concentration of the polymer solution. $V_{rel}$ is a unitless ratio, thus $V_{inh}$, is expressed in units of inverse concentration, typically as deciliters per gram ("dl/g").

The invention is further directed, in part, to fabrics that include filaments or yarns of the present invention, and articles that include fabrics of the present invention. For purposes herein, "fabric" means any woven, knitted, or non-woven structure. By "woven" is meant any fabric weave, such as, plain weave, crowfoot weave, basket weave, satin weave, twill weave, and the like. By "knitted" is meant a structure produced by interlooping or intermeshing one or more ends, fibers or multifilament yarns. By "non-woven" is meant a network of fibers, including unidirectional fibers (if contained within a matrix resin), felt, and the like.

"Fiber" means a relatively flexible, unit of matter having a high ratio of length to width across its cross-sectional area perpendicular to its length. Herein, the term "fiber" is used interchangeably with the term "filament". The cross section of the filaments described herein can be any shape, but are typically circular or bean shaped. Fiber spun onto a bobbin in a package is referred to as continuous fiber. Fiber can be cut into short lengths called staple fiber. Fiber can be cut into even smaller lengths called floc. The term "yarn" as used herein includes bundles of filaments, also known as multifilament yarns; or tows comprising a plurality of fibers; or spun staple yarns. Yarn can be intertwined and/or twisted.

Test Methods

Yarn tenacity is determined according to ASTM D 885 and is the maximum or breaking stress of a fiber as expressed as either force per unit cross-sectional area, as in giga-Pascals (GPa), or in force per unit mass per length, as in grams per denier or grams per dtex.

Inherent viscosity is determined using a solution in which a polymer is dissolved in a concentrated sulfuric acid with a concentration of 96 wt % at a polymer concentration (C) of 0.5 g/dl and at a temperature of 25° C. Inherent viscosity is then calculated as ln ($t_{poly}/t_{solv}$)/C where $t_{poly}$ is the drop time for the polymer solution and $t_{solv}$ is the drop time of the pure solvent.

Percent sulfur is determined according to ASTM D4239 Method B.

Moisture content of the fiber was obtained by first weighing the fiber sample, placing the sample in an oven at 300° C. for 20 minutes, then immediately re-weighing the sample. Moisture content is then calculated by substracting the dried sample weight from the initial sample weight and dividing by the dried sample weight times 100.

Many of the following examples are given to illustrate various embodiments of the invention and should not be interpreted as limiting it in any way. All parts and percentages are by weight unless otherwise indicated.

EXAMPLES

General

A copolymer was made by coplomerizing the monomers para-phenylenediamine, 5(6)-amino-2-(p-aminophenyl)benzimidazole; and terephthaloyl dichloride. The molar ratio of 5(6)-amino-2-(p-aminophenyl)benzimidazole to para-phenylenediamine was 70:30 and the molar ratio of para-phenylenediamine and 5(6)-amino-2-(p-aminophenyl)benzimidazole to terephthaloyl dichloride was 1:1. A spin solution of the copolymer in sulfuric acid was then made and filaments were air gap spun from a spinneret into a coagulation bath to form a copolymer yarn. The yarn was comprised of 270 filaments having a linear density of 3 denier per filament. The yarn was then washed with water and wound onto bobbins. The inherent viscosity and the percent sulfur was measured on a sample of this yarn. The resulting yarn had a sulfur content of 3.08 weight percent and an inherent viscosity of 3.54 dl/g The yarn was then fed from the bobbin to a series of 10 sequential wash cabinet modules, each having a pair of washing rolls. The yarn was washed through all 10 sequential modules using 20 spiral wraps around the pair of rolls in each module. The wash liquid in the sixth and eighth modules was a 2% by weight aqueous sodium hydroxide. The other washes were with plain water. The wet yarn was then dried as shown in the following examples.

Comparative Example A

A sample of the wet yarn was run through a high temperature oven having rolls. The first heated roll the wet yarn contacted had a surface temperature of 180° C. The yarn was dried at that temperature.

Example 1

Several samples of the wet yarn were first run across the low temperature dryer rolls operating at a constant surface temperature and then run through the high temperature oven having rolls mentioned in the Comparative Example. Individual separate runs were made at different dryer roll temperatures followed by high temperature drying at 180° C. in the roll oven. Specifically, separate samples of the wet yarn were run through the dryer rolls operating at 25° C., 60° C., 70° C., 80° C., 90° C., 100° C., 110° C., and 120° C. In other words, the first heated roll the wet yarn contacted was 25° C., 60° C., 70° C., 80° C., 90° C., 100° C., 110° C., and 120° C. The total residence time on the dryer rolls was 4.5 minutes and then passed through the coupled roll oven to complete drying.

Example 2

The set of yarns from Example 1 and the yarn from Comparative Example A were then each individually and identically heat treated in a refractory style tube oven operating at a maximum temperature of 400 C. Each yarn was then tested for tenacity and then plotted versus the first roll temperature experienced by the yarn as shown in Example 1. The relative tenacity of these yarns was then calculated using the following equation; for convenience the highest measured tenacity was chosen as the Reference Tenacity:

Relative Tenacity=Actual Tenacity/Reference Tenacity

Figure 2:
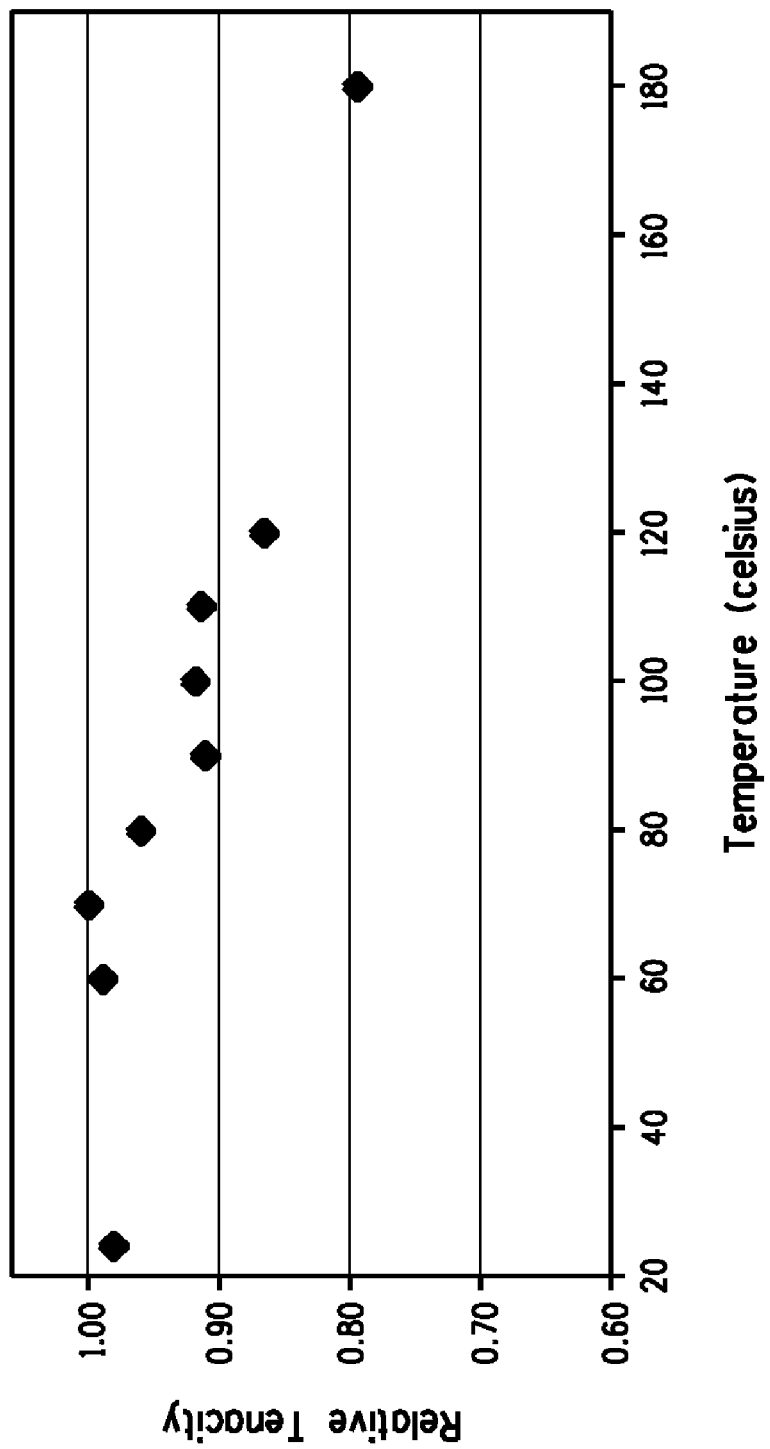
FIG. 2 presents a plot of yarn relative tenacity versus first drying roll temperature.

FIG. 2 is a graph of first roll temperature versus relative tenacity and illustrates that higher yarn tenacities result from controlling the initial drying temperature experienced by the yarn.

Example 3

Example 1 and Example 2 can be repeated by drying the yarns using a tension of at least 0.1 gpd, followed by heat treating the same yarns using a tension of less than 1 gpd with similar result.

What is claimed:

1. A process for reducing water in never-dried fiber comprising copolymer derived from the copolymerization of para-phenylenediamine, 5(6)-amino-2-(p-aminophenyl)benzimidazole, and terephthaloyl dichloride, the process having the following steps in a continuous process:
    (a) a step of drying a never-dried fiber having at least 0.1 wt % sulfur at 150° C. or less until the moisture content of the fiber is less than 60 weight percent; and
    (b) a step of further drying the fiber above 150° C. while the moisture content of the fiber is less than 60 weight percent;
    the fiber being further heated to at least 350° C. in either an additional continuous or separate step.

2. The process of claim 1 where in step (a) the fiber is dried at 100° C. or less.

3. The process of claim 2 where in step (a) the fiber is dried at 50° C. or less.

4. The process of claim 1 where in step (a) the fiber is dried until the moisture content is less than 50%.

5. The process of claim 4 where in step (a) the fiber is dried until the moisture content is less than 40%.

6. The process of claim 2 wherein after step (a), the fiber is further dried at an additional step at less than 150° C. until moisture content is less than 50%, prior to step (b).

7. The process of claim 6 wherein after step (a) the fiber is further dried at an additional step at less than 150° C. until moisture content is less than 40%, prior to step (b).

8. The process of claim 1, wherein the fiber is heated above 400° C. in the last step.

9. The process of claim 1, wherein the fiber is heated in step (a) under a tension of at least 0.1 gpd.

10. The process of claim 1, wherein the fiber is heated in the last step under a tension of less than 1 gpd.

11. The process of claim 1, wherein the ratio of moles of 5(6)-amino-2-(p-aminophenyl)benzimidazole to the moles of para-phenylenediamine is 30/70 to 85/15.

12. The process of claim 11 wherein the ratio is 45/55 to 85/15.

13. The process of claim 1, wherein the fiber is heated in an oven in step (a).

14. The process of claim 1, wherein said fiber is heated by contacting said filaments with a hot surface.

15. A process for producing filaments comprising a copolymer derived from the copolymerization of para-phenylenediamine, 5(6)-amino-2-(p-aminophenyl)benzimidazole, and terephthaloyl dichloride, including the following steps in a continuous process:
    (a) a step of spinning filaments into a coagulation bath from a sulfuric acid solution of the copolymer;
    (b) a step of contacting the filaments with one or more of (i) wash and (ii) neutralization fluid;
    (c) a step of drying the filaments having at least 0.1 wt % sulfur at 150° C. or less until the moisture content of the filaments is less than 60 weight percent;

(d) an optional step of further drying the filaments at a temperature higher than step (c);

(e) a step of further drying the filaments above 150° C. while the moisture content of the fiber is less than 60 weight percent;

the filaments being further heated to at least 350° C. in either an additional continuous or separate step.

16. The process of claim 15 wherein the filaments are heated above 400° C. in the last step.

17. The process of claim 15 wherein the filaments are heated in step (c) under a tension of at least 0.1 gpd.

18. The process of claim 15 wherein the filaments are heated in the last step under a tension of less than 1 gpd.

19. The process of claim 15 wherein said filaments are heated by contacting said filaments with a hot surface.

* * * * *